United States Patent [19]
Telesio

[11] 3,783,964
[45] Jan. 8, 1974

[54] VEHICLE WITH QUICK-DISCONNECT ENGINE MODULE

[76] Inventor: George O. Telesio, 7709 S. Milan Ave., Whittier, Calif. 90601

[22] Filed: Mar. 2, 1972

[21] Appl. No.: 231,133

[52] U.S. Cl............................................. 180/64 L
[51] Int. Cl............................................. B60k 5/10
[58] Field of Search............ 180/64 L, 64 M, 64 R, 180/89, 1 R; 214/82, 83.3, 503; 296/65 R

[56] References Cited
UNITED STATES PATENTS

| | | | |
|---|---|---|---|
| 2,974,998 | 3/1961 | Himka............................... | 296/65 R |
| 2,613,754 | 10/1952 | Van Doorne...................... | 180/64 L |
| 3,451,571 | 6/1969 | Brisson........................... | 180/64 L X |
| 2,623,602 | 12/1952 | Double........................... | 180/64 R X |
| 3,489,302 | 1/1970 | Danzart ............................ | 214/82 X |

FOREIGN PATENTS OR APPLICATIONS

| | | | |
|---|---|---|---|
| 553,185 | 5/1943 | Great Britain .................... | 180/64 L |
| 446,456 | 4/1936 | Great Britain ..................... | 180/64 L |

*Primary Examiner*—David Schonberg
*Assistant Examiner*—Milton L. Smith
*Attorney*—Christie, Parker & Hale

[57] ABSTRACT

A commercial vehicle, such as a refuse collection truck, has a chassis which includes a frame, drivable ground-engaging traction means mounted to the frame, and drive means coupled to the traction means and connectible to an engine for driving the traction means. An engine for the vehicle is carried in a support which is mounted to the frame for movement of the support between a retracted position, in which the engine is connected to the drive means, and an extended position in which the engine is disconnected from the drive means and is accessible for ready disconnection from the support and the vehicle. Selectively operable means are provided for moving the engine support between its retracted and extended positions relative to the frame and for connecting the engine to the drive means in the retracted position of the support. All control systems provided between the vehicle operating station and the engine include quick-disconnect couplings by which the engine is readily disconnected from the vehicle. Also, fuel lines and the like associated with the engine also include quick-disconnect couplings.

5 Claims, 9 Drawing Figures

PATENTED JAN 8 1974 3,783,964

PATENTED JAN 8 1974 3,783,964

VEHICLE WITH QUICK-DISCONNECT ENGINE MODULE

BACKGROUND OF THE INVENTION

1. Field of the Invention

This invention pertains to vehicles and, more particularly, to commercial vehicles in which the propulsion engine is provided as a module which is readily removable from the vehicle for the purpose of changing engines.

2. Description of the Prior Art

Refuse collection vehicles are typical of many types of commercial vehicles which are subjected to strenuous use throughout their useful life. Such vehicles represent considerable capital investment by their owners and are economically productive to their owners only so long as they are being operated in the area of their intended use. Refuse collection routes are planned to provide the maximum service by use of the smallest number of vehicles. The breakdown of such vehicles, because of engine failure or the like, results in considerable loss of revenue to the owner, both directly and indirectly.

For example, if a refuse collection business is predicated upon the use of conventional vehicles, it is necessary for the operator of the business to expect, based upon experience, that a reasonably predictable percentage of the useful time of the fleet of collection trucks will be wasted due to mechanical breakdowns. The breakdown-time pertinent to any fleet of trucks can be reduced by preventive maintenance programs, but such programs can be carried out only when the vehicles are not otherwise in service, as during early morning or evening hours when labor costs are at a premium. Vehicle breakdowns in excess of the normal experience factor, or breakdowns occurring simultaneously, produce considerable disruption in the normal refuse collection processes; if schedules are to be maintained from day to day, overtime wages must be paid to at least one refuse collection crew in order that time lost from an unexpected breakdown does not affect operations during the next working day.

Engine failure in conventional vehicles of the type represented by refuse collection vehicles is inherently common notwithstanding comprehensive and diligent preventive maintenance programs. The stop-and-go low speed use of such vehicles for a substantial portion of their useful life is well-known to be much more productive of mechanical failure than constant speed operation of a vehicle for extended periods. It is for this reason that the experiential breakdown factor for vehicles of the type typified by refuse collection vehicles is considerably greater than the experiential breakdown factor for vehicles used in long distance moving, for example. Further, in-service engine failures in refuse collection vehicles and the like usually occur at locations remote from the normal garaging facility of the vehicle owner. Such vehicles are very large and cumbersome, and are not conveniently towed by the usual automotive tow vehicle. Thus, an engine failure in a refuse collection vehicle on a collection route, particularly where the breakdown is of serious character, produces serious adverse economic impact upon the vehicle owner. If the engine failure is of serious character, requiring a major repair or overhaul on the engine, it is usually necessary that the vehicle be towed by a heavy-duty tow vehicle to the owner's garage facilities, repaired and returned to its collection route. It is apparent that the time necessary to perform these operations can be quite expensive, particularly when the breakdown occurs far from the normal garage location.

In view of these factors, operators of refuse collection vehicles possess backup vehicles which normally are not scheduled for daily refuse collection usage, but rather are provided as spares to be substituted for vehicles which may break down in use. Reliance upon backup vehicles, however, is not economically desirable because such vehicles, as noted above, are costly; because they are not normally scheduled for use in the operations of the business, they constitute a substantial element of overhead expense.

Conventional refuse collection vehicles, for example, are arranged with the engine, the component of the vehicle most susceptible to failure, being installed as a semi-permanent component of the vehicle. Where the engine is semi-permanently installed in the vehicle, the removal of a defective engine from the vehicle and the installation of a new engine in the vehicle is a time-consuming process, which cannot, as a practical matter, due to the size of the engine, be performed except at a garage facility equipped for such purposes.

From the foregoing, it is apparent that a need exists for the provision of refuse collection vehicles, as well as other vehicles to which the above-described problems are pertinent to one degree or another, in which the engine may be removed from the vehicle by a single mechanic at a location remote from conventional garage facilities by the use of relatively simple tools. The fulfillment of this need would make it possible for the operator of a fleet of refuse collection vehicles, for example, to maintain an auxiliary service vehicle by which an operative spare engine could be taken to the location of a broken-down vehicle where the broken-down engine could be completely removed from the vehicle and replaced by an operative engine, and the refuse collection vehicle quickly be put back into service for its intended purpose. The auxiliary service vehicle could then be returned to a central garage for overhaul and repair of the defective engine, which, upon repair, would then serve as a replacement engine for the next vehicle which might experience engine failure. The overhaul and repair operations on the defective engine could be carried out during normal working hours, rather than after hours when premium wage scales prevail.

Another problem experienced by operators of refuse collection vehicles, among others, is the problem of legally allowable axle loadings in the vehicle. Refuse collection vehicles conventionally are arranged with the operator cab and engine compartment located at the forward end of the vehicle, but somewhat behind the front wheels of the vehicles. The storage bin, into which the refuse collected by the vehicle is loaded, is disposed to the rear of the vehicle, albeit over a major portion of the length of the vehicle, and conventionally overhangs the rear axle of the vehicle, often to a considerable distance. Storage bins of these vehicles conventionally include compaction mechanisms which are operative at the will of the operator to compress and increase the density of the collected refuse, thereby extending the time during which a vehicle may be operated usefully on a collection route, rather than in transit to and from a refuse disposal site. Conventionally, these compaction mechanisms are so located in the vehicle as to produce substantial load on the rear axle of the vehicle when the vehicle is light, i.e., empty. The axle loading regulations of most states, however, provide that once the loading on any axle of the vehicle reaches the legally allowable load, no more weight may be added to the vehicle even though other axles of the vehicle may not have been loaded to the legal limit. In the case of conventional refuse collection vehicles, due to their arrangement as described above, it is common that the rear axle of the vehicle will be loaded to the legal limit at a time when the front axle of the vehicle is loaded only to about 60 percent of the legal load and at such time the storage compartment of the vehicle is not fully loaded. The economics of refuse collection vehicles, therefore, would be substantially improved if the geometry and arrangement of the vehicle could be arranged so that, at the time the legal load limit of any axle of the vehicle is reached, the storage compartment of the vehicle is essentially full and the loading of all other axles of the vehicle closely approaches the legal limit. That is, a need exists for the provision of a refuse collection vehicle in which, at the time the refuse collection compartment of the vehicle is fully loaded, the load applied to all axles of the vehicle is close to, but somewhat less than, the legally allowable axle load.

SUMMARY OF THE INVENTION

This invention provides a simple, efficient, economic and reliable refuse collection vehicle which meets both of the needs described above, That is, a vehicle according to this invention has a modular engine arrangement by which an engine, in the event of failure, can be quickly removed from the vehicle to be replaced by an operative engine, and such replacement procedure can be practiced by one person using simple and relatively inexpensive equipment. Also, the vehicle is arranged to produce substantially uniform axle loading at or below the legally allowable axle load when the refuse storage compartment of the vehicle is loaded to capacity. This means that for a vehicle of given dimension, substantially greater quantities of refuse can be loaded onto the vehicle than for a conventional refuse collection vehicle of similar dimension. This benefit necessarily means that the present refuse collection vehicle can be operated for a greater percentage of its useful life on a refuse collection route, rather than in transit to and from a dump or other refuse disposal site. The benefit to the operator of a fleet of such vehicles is that fewer vehicles, and therefore less capital investment, are necessary to adequately service a given number of collection sites through a particular geographic area, and fewer personnel are required to operate these vehicles. Also, because of the ready interchangability of engines in these vehicles, vehicles experiencing engine failure on a collection route may be placed back in service quickly, with considerably reduced loss to the vehicle owner. The use of vehicles according to this invention throughout a fleet of many refuse collection vehicles may make it possible to do away with standby vehicles, and also to simplify and reduce the cost of a comprehensive preventive maintenance program.

Generally speaking, a vehicle according to this invention comprises a chassis which includes a frame, drivable ground-engaging traction means mounted to the frame, and drive means coupled to the traction means and connectible to an engine for driving the traction means. An engine and a support for the engine are provided. The engine support is mounted to the frame for movement between a retracted position, in which the engine is connected to the drive means, and an extended position in which the engine is disconnected from the drive means and is accessible for disconnection from the support. The vehicle also includes selectively operable means for moving the engine support between its retracted and its extended positions relative to the frame, and for connecting the engine to the drive means in the retracted position of the support.

Refuse collection vehicles provide the presently preferred embodiment of this invention because the economic advantages produced by this invention are especially great in the refuse collection industry. It will be appreciated, however, that vehicles constructed according to the teachings of this invention may be used for other purposes and in other industries. For example, the quick-disconnect modular engine arrangement of the present invention can be used to advantage in earth moving equipment such as bulldozers and the like.

DESCRIPTION OF THE DRAWINGS

The above-mentioned and other features of this invention are more fully set forth in the following detailed description of a presently preferred embodiment of the invention, which description is presented with reference to the accompanying drawings, wherein.

DESCRIPTION OF THE ILLUSTRATED EMBODIMENTS

Figure 1:
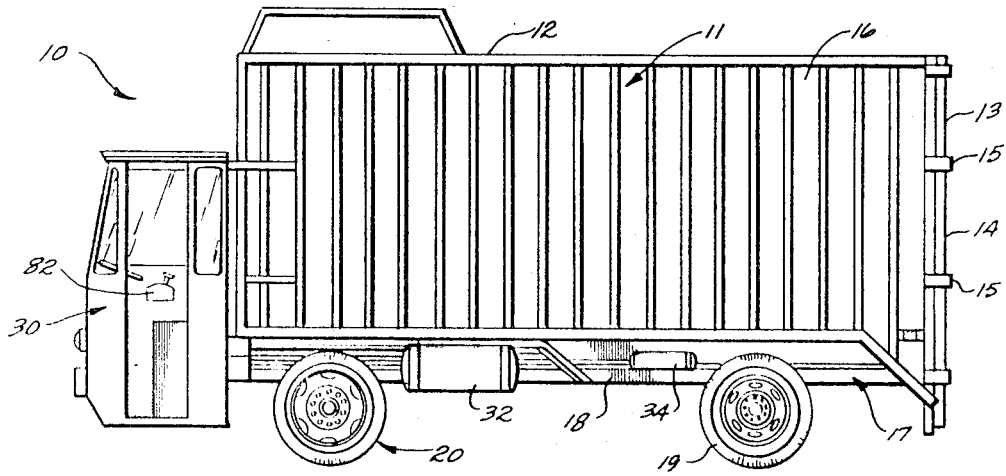
FIG. 1 is a side elevation view of a refuse collection vehicle according to this invention.

A refuse collection truck 10, as shown in FIG. 1, is the presently preferred vehicle according to this invention. Truck 10 includes a refuse storage bin 11 which has a generally open top 12 and a selectively openable rear end 13 which is closed by a pair of doors 14 supported by suitable hinges 15 to the rear edges of side walls 16 of the bin. The bin is supported upon a truck chassis 17 which is shown best in FIG. 2, such figure being a top plan view of truck 10 with bin 11 removed. Chassis 17 includes an elongate structural frame 18 which is supported upon a rear axle assembly 19 and a front axle assembly 20. The rear axle assembly preferably includes four drive wheels 21 which, broadly, are ground engaging traction means of the truck. A drive shaft 22 interconnects a differential 24 of the rear axle assembly with a transmission 26 mounted just to the rear of an engine 25 disposed at the front end of truck 10. The drive shaft includes a pair of universal joints 27 disposed one adjacent the rear end of the transmission 26 (see FIG. 5) and one adjacent the forward end of differential 24. Front axle assembly 20 includes a pair of steerable wheels 28 and a power steering mechanism 29.

Figure 2:
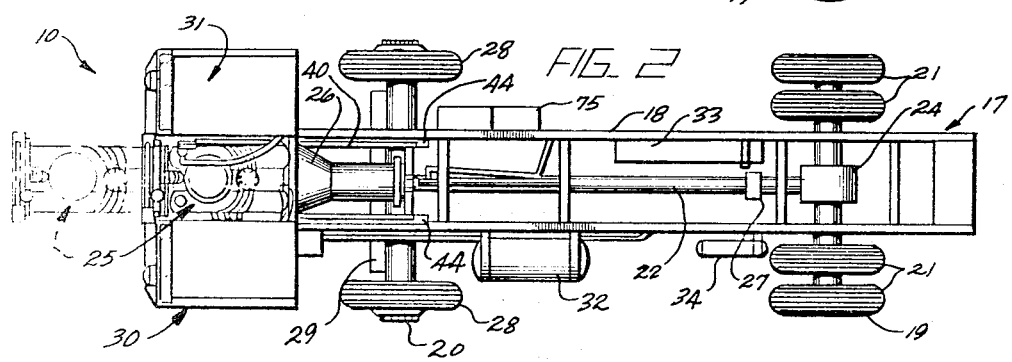
FIG. 2 is a top plan view of the vehicle of FIG. 1 with the refuse storage bin thereof removed.

As shown best in FIG. 2, engine 25 is disposed between a driver's cab 30 and a cab 31 for a crewman of the vehicle. Normally, a vehicle of the type illustrated in FIG. 1 is manned by a driver and one crewman, the crewman conventionally being referred to as a "swamper."

Refuse truck 10 includes a loading mechanism which is operative for receiving refuse-filled receptacles and for transferring the contents of the receptacles to bin 11 by movement of the receptacle from a receiving position at the front of the vehicle to a discharging position disposed over the front end of the open top of the bin. The loading mechanism is not illustrated in FIG. 1 inasmuch as such mechanisms are conventional and form no part of the present invention.

Vehicle 10 also includes a fuel tank 32, a compressed air accumulator tank 33, and a hydraulic fluid reservoir 34, all mounted to frame 18 at suitable locations.

Figure 3:
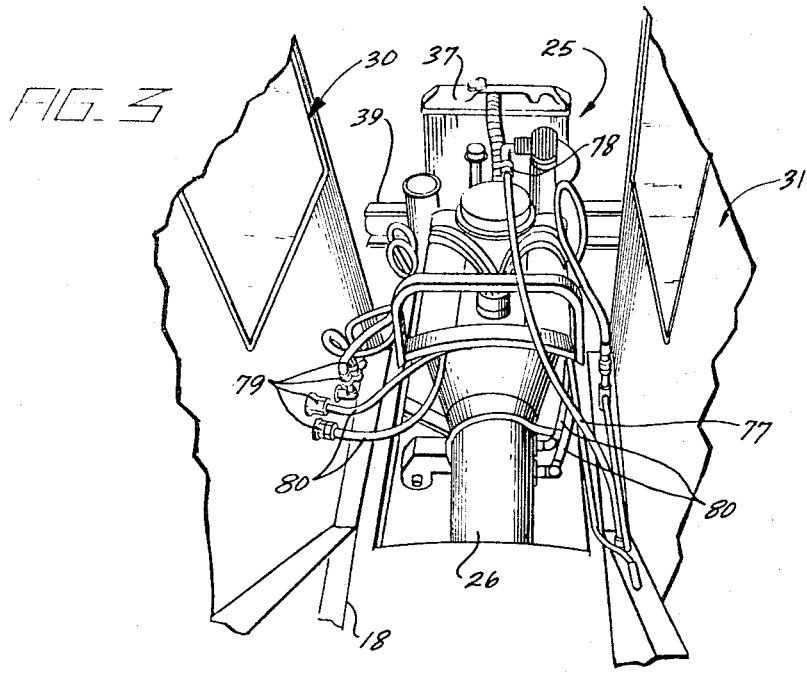
FIG. 3 is a perspective view of the quick-disconnect engine module in its extended position relative to the vehicle frame.
Figure 4:
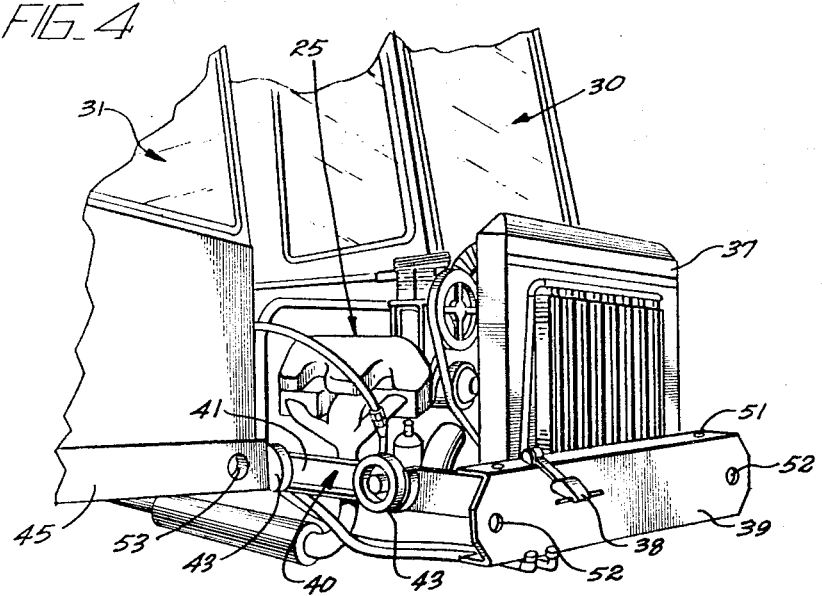
FIG. 4 is a side perspective view of the removable engine module in its extended position.

FIG. 3 is a perspective view of engine 25 looking downwardly and forwardly at the engine from a position adjacent the rear of driver's cab 30 and crewman's cab 31. In FIGS. 2, 3 and 4, a protective shroud for engine 25 has been eliminated from the drawings, and it will be understood that in normal use the engine is covered by a suitable protective shroud which preferably, in order to make the shroud as light as possible, is fabricated of fiberglass or the like. The shroud is held in position over the engine and around a radiator assembly 37 by suitable fasteners such as fastener 38 shown in FIG. 4 mounted to the upper portion of a center front bumper section 39.

Bin 11 is pivotally connected to chassis 17 adjacent the rear end of the chassis. The front end of the bin may be raised or lowered relative to the chassis by operation of a suitable hydraulic ram assembly (not shown) interconnected between the bin and the chassis at a suitable location forwardly of the pivotal connection of the bin to the chassis. This ram assembly is provided for discharging refuse collected in bin 11 at a suitable disposal site after doors 14 at the rear of the bin have been opened. Also, as is conventional, the interior of the bin houses a suitable refuse compaction mechanism (not shown) which is operative at the control of the driver or crewman to compact refuse received within bin 11 so that the bulk density of the refuse disposed within the bin may be increased, thereby to increase the net carrying capacity of the truck.

In truck 10, engine 25 is not mounted directly to frame 18. Rather, engine 25 is carried by a support frame 40, which is shown best in FIGS. 4 and 5 and of which front bumper section center 39 forms a transverse forward element. Frame 40 also includes a pair of parallel side members 41 and suitable transverse elements including a rear transverse element 42 interconnected between side elements 41. A plurality of wheels 43 are connected to side elements 41 at spaced locations along each side of the frame. Preferably three wheels 43 are provided along the outboard faces of each of side elements 41. Wheels 43 cooperate in respective tracks 44 which are fixed to frame 18 to extend parallel to the centerline of chassis 17. Tracks 44 preferably are provided in the form of lengths of structural channel member which are so disposed in frame 18 that wheels 43 are positioned between the opposing surfaces of the channel flanges. It is also preferred that the two track members extend to the front end of chassis 17 where each track is connected to the inboard end of a side bumper section 45 disposed across the front of the driver cab and crewman cab, respectively. Frame 40 carries the conventional engine mounts by which engine 25 is mounted directly to frame 40, and frame 40 is in turn movably mounted to chassis 17. Transmission 26 is connected to the rear portion of engine 25 for movement with the engine fore and aft relative to chassis 17 in response to movement of the engine support frame within the chassis.

As shown in FIGS. 2, 3 and 4, engine support frame is so mounted to chassis 17 that engine 25 and transmission 26 are movable longitudinally linearly relative to chassis 17 between a retracted position, shown in solid lines in FIG. 2, and an extended position, shown in broken lines in FIG. 2. The extended position of the engine is located almost entirely forwardly of the truck. As shown in FIG. 4, when the engine is in its extended position, it is permissible that some of wheels 43 may be disposed forwardly of the front end of guide tracks 44. In its extended position, engine 25 is readily accessible for servicing and minor repairs by a mechanic or the like. In its retracted position, however, engine 25 is coupled to drive shaft 22 via transmission 26.

Figure 5:
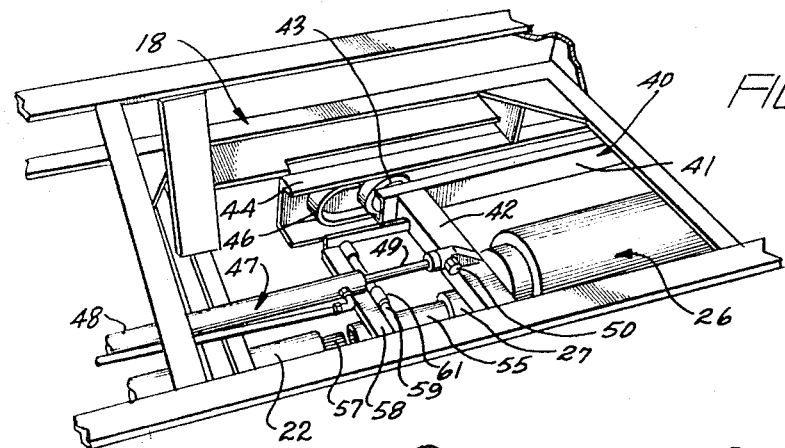
FIG. 5 is a fragmentary perspective view of a portion of the chassis of the vehicle shown in FIG. 1.

The retracted position of engine support frame 40 is defined with particularity by a pair of stop straps 46 which are preferably of forwardly opening, essentially U-shaped configuration disposed between the opposing surfaces of the flanges of track members 44 and within which wheels 43 cooperate in the manner shown best in FIG. 5. One stop strap 45 is associated with each of tracks 44. The extended position of engine support frame 40, on the other hand, is rather loosely defined by the extended condition of a hydraulic ram assembly 47 which is interconnected between frame 40 and chassis 17, and is operable for moving frame 40 between its extended and retracted positions. Ram assembly 47 constitutes reversible power means for driving support frame 40 in chassis 17. The ram assembly includes a cylinder 48 which is secured to chassis 17 and a cylinder 49 which is detachably connected, as at 50, to transverse member 42 of frame 40, for example.

FIG. 4 shows that front bumper center section 39 preferably is provided as a portion of a structural channel member which has its flanges extending rearwardly toward chassis 17 and in which the spacing between the channel flanges is somewhat greater than the height of side bumper sections 45. Also, the length of center bumper section 39 transversely of chassis 17 is greater than the spacing between tracks 44 such that the outer ends of front bumper center section 39 overlap the inboard ends of side bumper sections 45 when engine support frame 40 is disposed in its retracted position. When the front bumper center section is so mated with the side bumper sections, a hole 51 through the upper flange of the center bumper section is registered with vertical holes (not shown) through the side bumper sections; these holes are provided so that, in the retracted position of the engine, drift-lock pins may be engaged between the center and side bumper sections to mechanically lock the forward portion of frame 40 in position relative to vehicle chassis 17. Also, a hole is provided through each end of the web portion of the front bumper section channel to be aligned with an internally threaded hole 53 provided in each of side bumper sections 45 adjacent their inboard ends. When engine support frame 40 is fully retracted and pins have been inserted through holes 51, bolts (not shown) may be engaged through holes 52 into secure threaded engagement within holes 53 to still further secure frame 40 in its retracted position.

Figure 6:
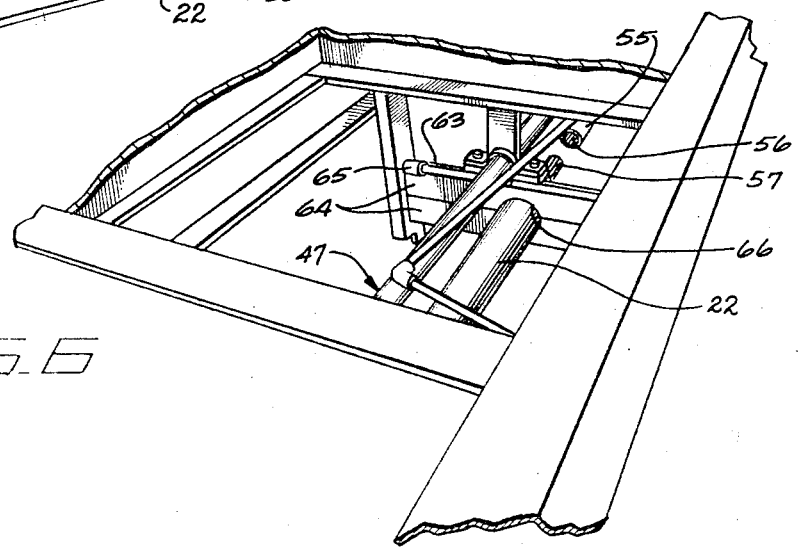
FIG. 6 is a perspective view from a different angle of the structure shown in FIG. 5.

It was mentioned above that the connection between transmission 26 and differential 24 includes two universal joints 27, one of which is mounted adjacent transmission 26. The forward universal joint is shown in FIG. 5 closely adjacent the rear of the housing of transmission 26 and is carried by a transmission output shaft which is coupled by the mechanism of the transmission to an engine output shaft. A stub shaft 55 extends rearwardly from the forward universal joint and defines a female spline 56, shown best in FIGS. 6, 8 and 9. Stub shaft 55 follows fore-and-aft movement of engine support frame 40 relative to chassis 17. The forward end of drive shaft 22 defines a male spline element 57 which does not follow fore-and-aft movement of the engine support frame. It is apparent, therefore, that movement of engine support frame 40 forwardly relative to chassis 17 from the retracted position of the engine support frame produces disconnection of spline elements 56 and 57. In order that engine 25 may be operatively coupled to drive wheels 21 upon return of the engine support frame to its retracted position, it is necessary that spline elements 56 and 57 be engaged with each other. The mounting of the engine support frame to chassis 17 includes means for automatically engaging spline elements 56 and 57 upon movement of the engine support frame into its retracted position.

Figure 8:
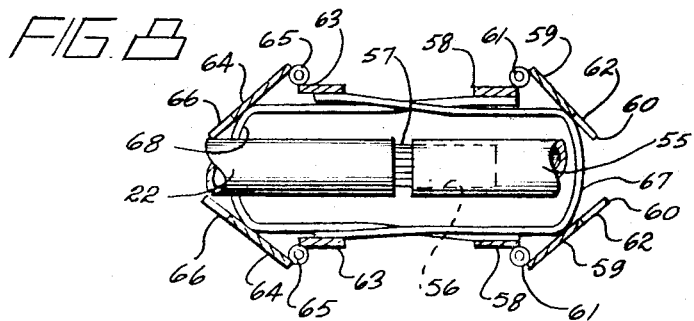
FIG. 8 is a fragmentary side elevation view of a portion of the interface structure between the vehicle chassis and engine support.
Figure 9:
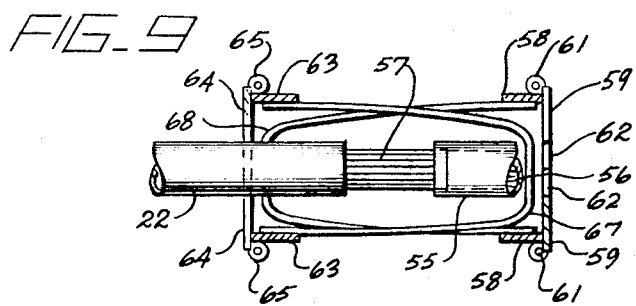
FIG. 9 is a view similar to FIG. 8 showing this mechanism in a different portion of its operative cycle.

As shown best in FIGS. 8 and 9, engine support frame 40 includes a pair of door support members 58 which extend transversely of the length of truck 10 above and below stub shaft 55 in spaced relation to the stub shaft. Each of a pair of supporting door plates 59 is hingably mounted to corresponding ones of members 58 along the forward edges of the members. The door plates are sized so that they have edges 60 which are disposed in substantial registration with each other when the door plates are substantially coplanar with each other, as shown in FIG. 9. Each door plate is mounted to the adjacent member 58 by a hinge coupling 61 and is spring loaded relative to its support member to be biased toward a vertical closed position in which edges 60 of the doors are in substantial registration with each other. Each door plate, along edge 60 thereof, defines a semi-circular recess 62. In the closed position of the doors, recesses 62 cooperate to define a circular aperture which is slightly larger than the outer diameter of stub shaft 55 at a location along the stub shaft rearwardly from forward universal joint 27. Door plates 59 are mounted to support members 58 so that they hinge forwardly and upwardly against their spring bias out of their closed positions; compare FIGS. 8 and 9.

Similarly, a pair of support members 63 are fixedly mounted to frame 18 to extend transversely of the frame above and below the forward portion of drive shaft 22 rearwardly from male spline element 57. Each of a pair of door plates 64 is hinged, as at 65, to the rear portion of a corresponding support member 63 for movement into and out of a vertical closed position.

Door plates 64 are spring biased about hinges 65 into their closed positions. The unhinged edge of each door plate 64 defines a semi-circular opening 66 which cooperates with the opening formed in the other door plate to define a circular aperture which is somewhat larger in diameter than the outer diameter of drive shaft 22.

Door plates 59 and 64 are so arranged that, when they are in their closed positions to cooperate with stub shaft 55 and drive shaft 22, respectively, the stub shaft and drive shaft are held in coaxial alignment with each other. Door plates 59 and 64 function to hold stub shaft 55 and drive shaft 22 in coaxial alignment with each other when engine support frame 40 is disposed more than a selected distance forwardly relative to frame 18 from its extreme retracted position. Preferably the selected distance referred to in the preceding sentence is a distance which is less than the length of male spline element 57 received within female spline element 56 in the extreme retracted position of frame 40. That is, the selected distance within which the doors are disengaged from shafts 55 and 22 is less than the operative axial lost-motion accommodation distance provided by the spline coupling. Thus, FIG. 9 shows door plates 59 and 64 in their closed positions at a point during the movement of engine support frame 40 relative to chassis 17 in which male spline element 57 is only nominally engaged with female spline element 56. FIG. 8, on the other hand, shows the structure when engine support frame 40 is fully retracted into chassis 17.

Assume that engine support frame 40 has been extended relative to chassis 17 and is being returned to its retracted position by operation of ram assembly 47. During all but the terminal stages of the movement of engine support frame 40 rearwardly in chassis 17, door plates 59 and 64 are in their closed position to keep stub shaft 57 and drive shaft 22 in coaxial alignment with each other. Therefore, as ram assembly 47 is operated to retract piston 49 into cylinder 48, the male and female spline elements move into engagement with each other as the engine support frame approaches its retracted position. After the male and female spline elements become initially engaged with each other as shown in FIG. 9, door plates 59 move into engagement with an opening member 67, and door plates 64 move into engagement with an opening member 68. Opening members 67 and 68 are similar to each other and preferably are provided as a piece of flat bar or the like bent into generally U-shaped configuration. Opening member 67 for doors 59 is fixed to chassis 17, as for example by connection of its opposite ends to support members 63 for doors 64. Opening member 68, on the other hand, is fixed to engine support frame 40 as by connection of its opposite ends to support members 58 for doors 59. Each opening member is configured adjacent its return bend portion, i.e., the base of its U-shaped configuration, so that it may pass between the support members for the doors with which that opening member cooperates. Thus, opening member 67, adjacent its forward end, is arranged so that it may pass between support members 58 for doors 59, and similarly for opening member 59 and support members 63 for doors 64. Opening members 67 and 68 are configured so that, as engine support frame 40 moves toward its retracted position, the opening members move into engagement with their respective pairs of door plates after male spline element 57 has moved into initial engagement with female spline element 56. Thereafter, continued rearward movement of engine support frame 40 causes opening member 67, for example, to move doors 59 about their hinge connection to support members 58 against the spring load provided for these door plates, thereby to move door plates 59 out of supporting engagement to stub shaft 57; a similar cooperation exists between opening member 68 and door plate 64 during these terminal stages of movement of engine support frame 40 into its retracted position. Accordingly, when engine support frame 40 is in its fully retracted position, door plates 59 and 64 are disengaged from stub shaft 55 and drive shaft 62, respectively, and spline elements 56 and 57 are fully engaged. Once the supporting door plates have been disengaged from the stub shaft and the drive shaft, the drive shaft and stub shaft can oscillate vertically in the desired manner to accommodate vertical movement of rear axle assembly 19 during operation of truck 10.

It will be apparent from the foregoing description that door plates 59 and 64 are engaged with stub shaft 55 and drive shaft 22 before the spline elements are fully disconnected during movement of the engine support frame out of its retracted position.

Figure 7:
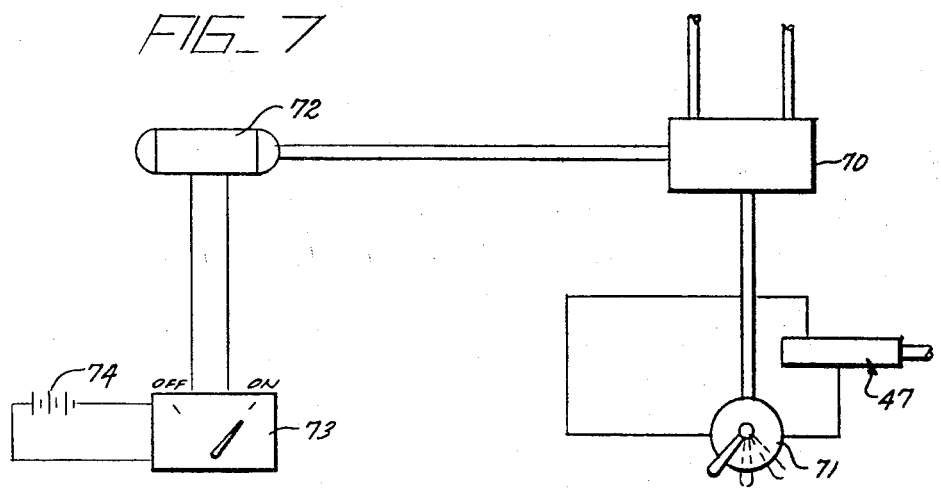
FIG. 7 is a schematic diagram of the drive and control mechanisms for the engine module of the vehicle.

As mentioned above, ram assembly 47 is provided in refuse truck 10 for moving engine support frame 40 between its extended and retracted positions. Accordingly, ram assembly 47 is a double-acting hydraulic ram assembly, and is connected to a hydraulic pump 70 via a three-way control valve 71, as shown in FIG. 7. The three positions of valve 71 correspond to RETRACT, EXTEND and OFF states of operation of ram assembly 47. Pump 70 is driven by an electric motor 72, the operation of which is controlled by an ON/OFF switch 73 connected between the battery 74 of truck 10 and motor 72. Preferably pump 70, valve 71, motor 72 and switch 73 are disposed at a control station 75 (see FIG. 2) mounted to chassis 17 to the rear of the right front wheel of truck 10 at a position located to be readily accessible to a person standing beside the truck.

As shown best in FIG. 3, all control systems and the like associated with engine 25 are connected to the engine via quick-disconnect and lost-motion connections so that the engine can be operated in its extended position relative to chassis 17 for the purposes of minor repair, checkout and servicing. Thus, the coupling of the engine to the fuel tank 32 is by a long hose 77 and a quick-disconnect fitting 78; the engine is similarly connected to the vehicle electrical system by lost-motion and quick-disconnect connections. Similarly, throttle, gear shift and instrumentation connections between driver cab 30 and the engine and transmission are via quick-disconnect fittings 79 and flexible conduits 80. Thus, even though the engine is operatively disconnected from rear axle assembly 19 when the engine is in its extended position, the engine can be operated from driver compartment 30, as by a gear shift control 82 within cab 30, during normal servicing and minor repair procedures. On the other hand, if an extensive repair is required to engine 25, as when the engine may suffer major breakdown in use on a refuse collection route, the engine can be quickly disconnected from truck 10 by uncoupling quick-disconnect fittings 78 and 79, for example, and removing the entire engine, transmission and engine support frame from chassis 17. Such removal of the engine support frame from the chassis may be accomplished conveniently at the front end of the vehicle inasmuch as tracks 44 for engine support frame 40 extend to the front of the vehicle.

In view of the foregoing description, it will be apparent that truck 10 is particularly well suited for efficient and economic use on refuse collection routes and the like. If truck 10 should suffer a major engine failure on the refuse collection route, a spare engine module, i.e., an engine support frame with an engine 25, transmission 26, radiator 37, and associated equipment mounted thereto, can be dispatched from a central garage facility to the location of the disabled truck. The replacement engine module may be transported to the site of the disabled vehicle in a pickup truck, for example, equipped with a simple collapsible stiff-leg crane, for example. At the site of the disabled vehicle, the engine module in the disabled vehicle can be removed, placed on suitable blocks on the ground, and replaced by the operative engine module brought to the scene from the central garage. After insertion of the replacement module into the frame of the disabled vehicle, the replacement engine is quicky connected to the vehicle by means of quick-disconnect couplings 78 and 79, and the new engine is automatically coupled to rear axle assembly 19 as the new engine is moved into its retracted position in the chassis by operation of ram assembly 47. It has been found that a disabled engine can be replaced by a spare operative engine module in about twenty minutes in a truck having the features described above.

The extendability of engine 25 to a position well forward of vehicle 10 also makes it much simpler for a mechanic to service vehicle 10 as a part of a comprehensive preventive maintenance program. Also, in the event of a major failure of an engine in refuse truck 10, the engine can be completely removed from the truck and placed in a work area where the repair process can be carried out much more rapidly and efficiently than if the engine were kept in the vehicle. It is apparent, therefore, that refuse vehicle 10, by reason of the extendable and removable engine module described above, fills the first of two needs described above under the topic "Background of the Invention."

Another feature of refuse vehicle 10 is that, in its light-weight condition, the weight of the vehicle is distributed so that a principal portion of the weight of the vehicle is carried by front axle assembly 20. By locating driver compartment 30, crewman compartment 31, and engine 25 well forward of front axle 20, a substantially greater portion of the light weight of the vehicle is borne by front axle assembly 20 than is the case in refuse collection vehicles heretofore known. A result of this arrangement of vehicle 10 is that refuse collection bin 11 may be made of increased capacity and so disposed on chassis 17 that when bin 11 is filled sufficiently that the legally allowable load is imposed upon rear axle assembly 19, the load borne by the front axle assembly 20 closely approaches its legally allowable load value. This means that refuse collection truck 10 can legally carry greater weight than another more conventionally arranged vehicle of equal bin capacity.

Workers skilled in the art to which this invention pertains will appreciate that the refuse compaction mechanism normally provided within bin 11 is operative to compact collected refuse toward the rear end of bin 11. Thus, as truck 10 is operated on a refuse collection route, collected refuse tends to accumulate toward the rear portion of the vehicle such that the major portion of the weight of refuse accumulated within the bin is carried by rear axle assembly 19 rather than by front axle assembly 20. A more uniform distribution of the weight of accumulated refuse to the front and rear axles of the vehicle could be accomplished if the compaction mechanism operated toward the front and to the rear of bin 11. Conventionally, however, the compaction mechanism is also relied upon to assist in ejection of collected refuse at the disposal site. Inasmuch as bin 11 is emptied through its rear end, it follows that the compaction mechanism for vehicle 10 must operate toward the rear of the vehicle. The location of the majority of the light weight of truck 10 toward the front of the vehicle offsets the rearward distribution of the weight of accumulated refuse such that, at the time bin 11 is either completely filled or filled to such an extent that rear axle assembly 19 is subjected to the legally allowable load, the total weight of the vehicle is essentially uniformly distributed between the front and rear axles of the truck. It is apparent, therefore, that truck 10 also meets the second of the two basic needs described in the introduction to this specification.

Workers skilled in the art to which this invention pertains will readily appreciate that modifications and variations of the structures described above may be practiced without departing from the scope of this invention. Also, it should be realized that a refuse collection vehicle has been described above merely for the purposes of example, and that the principles and structures of this invention are not restricted to use in refuse collection vehicles. Accordingly, the foregoing description should not be considered as limiting the scope of this invention.

What is claimed is

1. A vehicle comprising a chassis including a frame, drivable ground engaging traction means mounted to the frame, and drive means coupled to the traction means and connectible to an engine for driving the traction means in response to operation of the engine, an engine, a support for the engine, means mounting the engine support to the frame for movement of the support between a retracted position, in which the engine is connected to the drive means, and an extended position in which the engine is disconnected from the drive means and is accessible for disconnection from the chassis, and selectively operable means for moving the engine support between its retracted and extended positions relative to the frame and for connecting the engine to the drive means in the retracted position of the support and wherein the drive means includes a drive shaft connected to the chassis at a location spaced from the support for pivotal movement relative to the frame during operation of the vehicle, an engine output shaft carried by the support for movement therewith, and a spline coupling between the engine output and drive shafts having a lost-motion accommodation distance less than the distance between the extended and retracted positions of the support, the spline coupling being defined for physical separation and disconnection of the elements defining said coupling for pivotal movement of the drive shaft when the spacing of the support from the retracted position thereof is greater than said lost-motion distance, and wherein the selectively operable means includes means for coaxially aligning the spline male and female elements when the support is between its retracted and extended positions but is within a range of positions spaced a selected distance from the retracted position of the support, the selected distance being greater than the lost-motion distance.

2. A vehicle according to claim 1 including means for disabling the aligning means when the support is at a position within said selected distance from the support retracted position.

3. A vehicle comprising a chassis including a frame, drivable ground engaging traction means mounted to the frame, and drive means coupled to the traction means and connectible to an engine for driving the traction means in response to operation of the engine, an engine, a support for the engine, means mounting the engine support to the frame and for movement of the support between a retracted position, in which the engine is connected to the drive means, and an extended position in which the engine is disconnected from the drive means and is accessible for disconnection from the chassis, and selectively operable means for moving the engine support between its retracted and extended positions relative to the frame and for connecting the engine to the drive means in the retracted position of the support and wherein the drive means includes a drive shaft connected to the chassis for pivotal movement relative to the frame during operation of the vehicle, an engine output shaft carried by the support for movement therewith, and a spline coupling between the engine output and drive shafts having a lost-motion accommodation distance less than the distance between the extended and retracted positions of the support, and wherein the selectively operable means includes means for coaxially aligning the spline male and female elements when the support is between its retracted and extended positions but is within a range of positions spaced a selected distance from the retracted position of the support, the aligning means including a positioning member movably mounted to the frame for movement between an operative position in which the member engages the drive shaft adjacent the spline coupling and disposes the drive shaft in a predetermined position relative to the frame and an inoperative position in which the member is disengaged from the drive shaft, means coupled to the positioning member for biasing the member into its operative position, and means carried by the support for engaging the positioning member and moving the member out of its operative position when the support is within said selected distance of its retracted position.

4. A vehicle according to claim 3 wherein the engine output shaft includes a universal joint between the engine and the spline coupling, and a second positioning member mounted to the support for movement into and out of an operative position in which the second member engages the engine output shaft and positions it in coaxial alignment with the predetermined position of the drive shaft, means coupled to the second positioning member biasing it into its operative position, and means mounted to the frame for engaging the second positioning member and moving the member out of its operative position when the support is within said selected distance of its retracted position.

5. A vehicle comprising a chassis including a frame, drivable ground engaging traction means mounted to the frame, and drive means coupled to the traction means and connectible to an engine for driving the traction means in response to operation of the engine, an engine, a support for the engine, means mounting the engine support to the frame for movement of the support between a retracted position, in which the engine is connected to the drive means, and an extended position in which the engine is disconnected from the drive means and is accessible for disconnection from the chassis, and selectively operable means for moving the engine support between its retracted and extended positions relative to the frame and for connecting the engine to the drive means in the retracted position of the support and wherein the drive means includes a drive shaft connected to the chassis for pivotal movement relative to the frame during operation of the vehicle, an engine output shaft carried by the support for movement therewith, and a spline coupling between the engine output and drive shafts having a lost-motion accommodation distance less than the distance between the extended and retracted positions of the support, the engine output shaft including a universal joint between the engine and the spline coupling, and wherein the selectively operable means includes means for coaxially aligning the spline male and female elements when the support is between its retracted and extended positions but is within a range of positions spaced a selected distance from the retracted position of the support, said aligning means including a positioning member mounted to the support for movement into and out of an operative position in which the member engages the engine output shaft between the universal joint and the spline coupling and disposes the output shaft in a predetermined position, means coupled to the positioning member biasing it into its operative position, and means mounted to the frame for engaging the positioning member and moving the member out of its operative position when the support is within said selected distance of its retracted position.

\* \* \* \* \*